United States Patent [19]

Beach

[11] 4,367,190
[45] Jan. 4, 1983

[54] SCREW EXTRUDER

[75] Inventor: Shirley Beach, North Vancouver, Canada

[73] Assignee: Phillips Cables Limited, Brockville, Canada

[21] Appl. No.: 263,200

[22] Filed: May 13, 1981

[30] Foreign Application Priority Data

Dec. 10, 1980 [CA] Canada .................................. 366508

[51] Int. Cl.³ .............................................. B29F 3/10
[52] U.S. Cl. .................................... 264/174; 264/349;
366/81; 366/89; 425/113; 425/208
[58] Field of Search ...................... 264/174, 349, 45.9,
264/50, 176 R; 425/113, 208, 203, 207, 205;
366/81, 89

[56] References Cited

U.S. PATENT DOCUMENTS

| | | | |
|---|---|---|---|
| 3,486,193 | 12/1969 | Gwinn et al. | 425/207 |
| 3,701,512 | 10/1972 | Schippers et al. | 366/81 |
| 3,762,693 | 10/1973 | De Boo et al. | 366/81 |
| 4,053,143 | 10/1977 | Hosokawa et al. | 366/89 |
| 4,103,353 | 7/1978 | Dougherty | 366/81 |
| 4,107,260 | 8/1978 | Dougherty | 264/176 R |
| 4,181,647 | 1/1980 | Beach | 264/45.9 |
| 4,250,132 | 2/1981 | Beach | 264/68 |

FOREIGN PATENT DOCUMENTS

| | | | |
|---|---|---|---|
| 1059718 | 8/1979 | Canada . | |
| 2401383 | 8/1974 | Fed. Rep. of Germany | 425/208 |
| 2311946 | 9/1974 | Fed. Rep. of Germany | 425/208 |

Primary Examiner—Jeffery R. Thurlow
Attorney, Agent, or Firm—Bachman and LaPointe

[57] ABSTRACT

An insulating coating of extruded polymer material is formed around a moving conductor wire; the extruder includes a decompression zone effective to arrest shear degradation of the polymer such that the melt index of the insulating polymer on the insulated wire is not more than 50% of the melt index of the solid, particulate polymer material before extrusion; the extruder includes valve means and intense mixing means which ensure that the polymer melts in a controlled manner whereby a uniform extrudate is formed.

10 Claims, 4 Drawing Figures

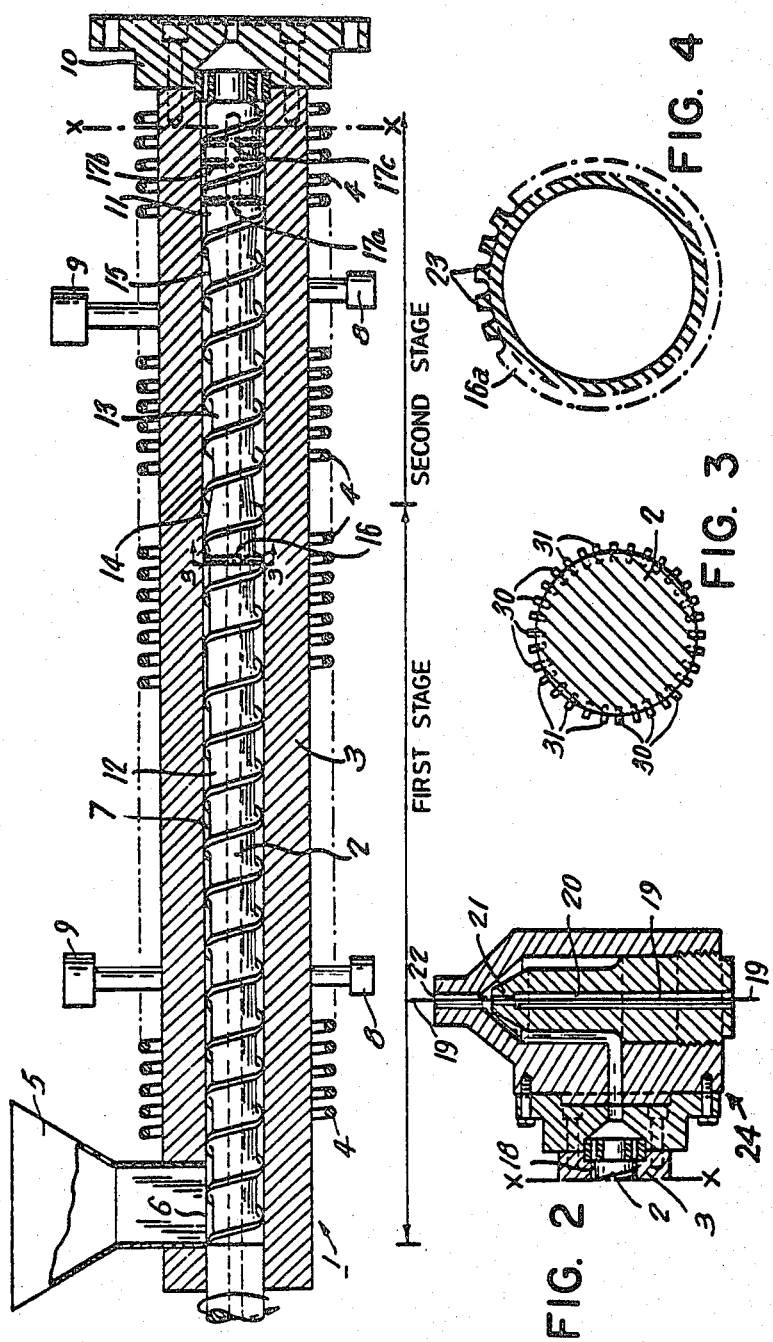

SCREW EXTRUDER

BACKGROUND OF THE INVENTION

1. Field of the Invention

This invention relates to a method and apparatus for producing an extrudate from a thermoplastic polymer material.

2. Description of Prior Art

The invention is particularly concerned with the continuous extrusion of a polymer material to form an extrudate about a continuously traveling conductor wire to form an insulated wire. Such insulated wires are widely used in electric power cables and communication cables.

In producing such conductor wires it is important that the extrudate be uniform in its characteristics. In order to achieve this it is important that the polymer material be melted and worked to a uniform state. On the other hand, it is desirable that the extrusion proceed at a high rate to achieve an efficient line speed. In general the rate of extrusion dictates the line speed in cable production, the extrusion rate being dictated by the aforementioned need for a uniform extrudate.

Thus, on the one hand, it is desirable to retain the polymer material in the extruder for a long period to ensure that the polymer material is fully melted and worked throughout to produce a uniform extrudate; and, on the other hand, it is desirable to pass the polymer material through the extruder in the shortest time possible to achieve a highline speed.

It is well known that in melting a polymer material in a screw extruder, the melt proceeds non-uniformly. The polymer material is subjected to heat from the heating elements of the screw extruder as well as heat developed as frictional heat by the different forces to which the polymer material is subjected including the shear forces developed between adjacent particles of solid or semi-solid polymer material, between adjacent portions of molten polymer material, the interaction of the advancing screw thread and the polymer material in its different physical states, and the interaction between polymer material and the interior wall of the barrel of the extruder as the advance of the polymer material is opposed by the barrel wall.

Organic polymer materials are poor conductors of heat and this also favours non-uniform heating so that in any particular length of advancing polymer material in a screw extruder, the polymer material throughout a cross-section of such length, will likely occur in different physical states ranging from the solid state to the fully fluid molten state.

A further problem is that the physical properties of polymer materials, particularly polyolefins may change significantly during extrusion. In particular the melt flow or melt index may deteriorate significantly during extrusion so that the polymer flows to readily. This deterioration results in part from shear degradation and in part from heat degradation. Employing the Normal ASTM Melt Index Test, the melt flow or melt index may increase by 80 to 90%. In other words the melt index of the polymer extrudate will be 80 to 90% higher than the melt index of the polymer prior to extruding. This increase in the melt index is generally unacceptable, in particular the Rural Electrification Administration (REA) of the U.S.A. stipulates that the melt index of the polymer extrudate, of insulated wires, not be greater than 50% of the melt index of the polymer prior to extrusion. This requirement has been widely adopted around the world.

In general as the melt index parameter increases the resistance to stress cracking or ESCR (environmental stress cracking resistance) decreases, which means that the insulated wire is more susceptible to crack formation in the insulation, and the problems associated therewith.

Attempts have been made to have the REA increase the maximum permitted change to 110%, which would be considerably less exacting requirement, but so far no change has been made so that insulated conductors must continue to meet the exacting requirement of a not more than 50% change in the melt index.

SUMMARY OF THE INVENTION

It is an object of the present invention to provide a method and apparatus in which a substantially uniform extrudate can be continuously extruded about a traveling conductor wire, and in which the polymer material can be melted and worked to a uniform state without a long dwell time in the extruder.

In accordance with the invention the uniformity of the extrudate is such that the variation in coaxial capacitance of the insulated wire produced in accordance with the invention is less than 1 picofarad/foot.

The present invention ensures that the polymer material is mixed to a uniform, molten state before reaching the discharge end and employs a low pressure decompression or relaxation zone prior to a final metering zone. This decompression or relaxation zone arrests the shear degradation of the polymer material in the screw extruder, whereby an extrudate can be produced which meets the exacting requirement of the REA.

According to the invention there is provided a screw extrusion apparatus for working a polymer material, which apparatus comprises a barrel leading from a feed port to a discharge, said barrel having a substantially cylindrical interior wall continuous from the feed port end to the discharge end, the wall defining a surface for flow of molten polymer material there against, electrical resistance heaters in said barrel for heating polymer material during passage through said barrel; a continuous feed screw provided with a core and helical thread rotatable in said barrel, said core having upstream and downstream portions interconnected by an intermediate portion of lesser diameter forming a low pressure decompression zone; intense mixing means in said downstream portion; and a combined valve and mixing means on said upstream portion; said combined valve and mixing means comprising at least two closely spaced apart rows of radially disposed lugs mounted normal to and circumferentially around the screw to form a ring, the lugs of one of said rows being in staggered relationship with the lugs of the other of said rows; and said intense mixing means comprising at least three spaced apart mixing elements disposed radially to said screw, each of said elements comprising at least a pair of adjacent rows of radially disposed lugs, the lugs of one row of a mixing element being in a staggered relationship with the lugs of the other of said rows.

According to another aspect of the invention there is provided a method of continuously producing a conductor wire insulated with an electrically insulating polymer material in extruded form, said method comprising the steps of: providing a screw extruder of the type including a barrel having mounted therein for rotation a screw effective to advance and shear solid particulate polymer material, said barrel having a substantially cylindrical interior wall continuous from a feed end of the extruder to a discharge end of the extruder, the wall defining a surface for flow of molten polymer material thereagainst; providing on the screw combined valve and mixing means effective to convert solid particulate polymer material to a polymer melt and to work in the polymer material wherein the combined valve and mixing means includes at least two closely spaced apart rows of radially disposed pins mounted normal to and circumferentially around the screw to form a ring and wherein the pins of one of the rows is in staggered relationship with the pins of the other of the rows; providing the screw with a low pressure decompression zone downstream of the valve means followed by a high pressure zone; providing on the screw downstream of the high pressure zone intense mixing means effective to intensively work the polymer material wherein the intense mixing means includes at least three spaced apart mixing rings disposed radially to the screw and each mixing ring including at least a pair of adjacent rows of radially disposed pins with the pins of each row of a mixing ring being in a staggered relationship with the pins of the adjacent row; providing an extrusion head for the extruder; passing a moving conductor wire through the extrusion head; introducing an electrically insulating, solid particulate polymer material, into the feed end of the extruder barrel; passing the material through the barrel, heating and shearing the material in a first upstream portion of the barrel; advancing the material through the barrel towards the combined valve and mixing means to convert the solid particulate polymer material to a polymer melt; advancing the polymer melt through said combined valve and mixing means to divide the melt into streams between the staggered pins, allowing said streams to re-unite on emerging from the combined means, whereby the polymer melt is thoroughly mixed; advancing the polymer melt into the decompression zone downstream of the combined valve and mixing means while maintaining the shearing; advancing the polymer melt through the decompression zone as a flow of essentially molten material, against said interior wall surface; forcing the resultant mass out of the decompression zone and into the zone of higher pressure, passing the mass through the intense mixing means and subjecting it to an intense mixing action; forcing the mixture through the extrusion head and about the moving conductor wire; and then collecting the conductor wire insulated with insulating material.

The valve and mixing means of the screw extruder of the invention ensure that the transition to the molten state commences adjacent the feed end, and additionally provide zones of intense mixing separated by the quiet non-intensive mixing in the decompression or relaxation zone.

DESCRIPTION OF THE PREFERRED EMBODIMENTS

Typical polymer materials which may be employed for the manufacture of insulating extrudate include polymers or mixtures of polymers obtained by the polymerization or copolymerization of aliphatic olefins, for example, ethylene, propylene and butene; halogenated aliphatic olefins, for example, vinyl chloride. In the manufacture of insulated conductor wires for communication cables, polyethylene and polypropylene are especially preferred. Particularly useful copolymers include copolymers of ethylene and butene and copolymers of propylene and ethylene, propylene/ethylene copolymers containing 80% propylene and 20% ethylene are especially preferred.

The screw extruder of the invention includes both a combined valve and mixing means, hereinafter simply referred to, for convenience, as "valve means" in an upstream portion of the screw and a mixing means in a downstream portion.

It has been found that in a screw extruder the conversion of a solid polymer to a polymer melt must occur or at least be initiated within that upstream region of the barrel containing the first five turns of the helical flight from the feed end. Generally if at least the initiation of the conversion of the solid polymer material to the polymer melt does not occur in this region it becomes impossible to advance the polymer material through the screw extruder.

This factor is taken account of in determining the form and location of the valve means and mixing means, but especially the latter.

Considering the mixing means this comprises at least three spaced apart mixing elements disposed radially to the screw, each of which elements comprises at least a pair of adjacent rows of radially disposed lugs, the lugs of each row of a mixing element being in a staggered relationship with the lugs of the adjacent row so as to provide a tortuous path for the polymer serving to divide the molten material into streams which re-unite after passing each element, thereby producing an intensive mixing.

The lugs extend radially outwardly from the screw so that only a narrow clearance is provided between the ends of the lugs and the inner surface of the barrel.

Each row of lugs is suitably a row of pins the ends of which have a profile which is convexly curved to match the concave curvature of the inner surface of the barrel. Pins of this form have been found to be superior to pins having squared ends. Each row may similarly be composed of a toothed ring, but again toothed rings in which the teeth have rectangular ends are found to be less satisfactory than pins with rounded ends. It is believed that the narrow clearance between the pins with rounded ends and the inner surface of the barrel assists in forcing the polymer to take the tortuous path provided between the staggered pins.

A conventional screw has a length to diameter ratio (L/D ratio) of 24:1. For this screw it is found that the mixing means should desirably consist of only 3 or 4 spaced apart mixing elements each of which comprises 2 or 3 spaced apart rows of the staggered pins. If there are four spaced apart elements then there are preferably only two spaced apart rows in each element.

Optimum results are obtained with three mixing elements each comprising two rows of pins in staggered relationship. If less than three mixing elements are employed then the mixing obtained is inadequate, if more than four mixing elements are employed in this screw then undesirably high temperatures are generated by the very intense mixing. Further as the number of mixing elements is increased the point at which the solid polymer is converted by melting to a polymer melt moves downstream in the extruder, with the result that it may not take place within the region of the first five turns of the helical flight.

However, if the screw extruder is lengthened then additional mixing elements may be added although they may be unnecessary to obtain adequate mixing. Generally it is found that one additional mixing element comprising a double or a triple row of pins can be added for each additional 4 L/D of screw extruder. In other words if the L/D ratio of the screw is increased from 24:1 to 28:1, then one additional mixing element can be accommodated. If the L/D is increased to 32:1 then two additional mixing elements can be accommodated.

The valve means comprise at least two closely spaced apart rows of lugs mounted normal to and circumferentially around the screw to form a ring, the lugs of one of the rows being in a staggered relationship with the lugs of the adjacent row. The closely spaced rows and the staggered relationship of the lugs provide a tortuous path for the polymer. The valve means produces a back pressure which produces an additional mixing effect supplementing the mixing action provided by the lugs which divide the polymer into narrow streams which reunite.

The lugs of the valve means are preferably pins of the same form as the pins of the preferred mixing elements. Preferably the valve means comprises only 2 or 3 rows of the pins.

The valve means forms an obstacle to the passage of the polymer melt through the screw extruder and produces a back pressure which itself produces an intense mixing effect.

A further feature of the valve means is that it is a determining factor in the position in the screw extruder where the polymer melts; it is not the only factor, however, and the temperature of the material and the mixing means in the downstream portion of the screw are also factors. Nevertheless the preselection of the kind and location of the valve means is decisive in predetermining the position of formation of the polymer melt. This is highly significant because, as has already been described, it appears to be critical to produce the polymer melt close to the feed end of the screw for successful continuous operation.

When the polymer contains additives, for example, pigments, the intense mixing produced by the valve means assists in thoroughly dispersing these.

The screw of the screw extruder has a helical flight which is substantially continuous from the feed end to the die end. The flight is, however, interrupted at the locations where the pins of the valve means and mixing means are located; these locations where the flight is interrupted are thus very short in length being just sufficient to permit mounting of the pins so that a complete ring of pins is formed. Thus there are no flightless portions of the screw.

BRIEF DESCRIPTION OF THE DRAWINGS

The invention is illustrated in particular and preferred embodiments by reference to the accompanying drawings, in which:

FIG. 1 is a cross-sectional view of an extruder,

FIG. 2 is a cross-sectional view of a wire covering crosshead die used in extruding coatings about a wire conductor, FIG. 3 is a cross-section on a line 3—3 of FIG. 1, and FIG. 4 illustrates a toothed ring suitable as a valve means.

DESCRIPTION OF THE PREFERRED EMBODIMENTS WITH REFERENCE TO THE DRAWINGS

With reference to FIG. 1, an extruder 1 has a multizone two-stage feed screw 2 rotatably mounted in a barrel 3 heated by means of electrical resistance heaters 4.

The barrel 3 of the extruder is fitted with a feed hopper 5 having a feed port 6 situated at the base thereof, thermocouples 8, pressure gauges 9 and a die 10.

The barrel 3 has a substantially cylindrical interior wall 7 continuous from the feed port 6 to the die 10.

The feed screw 2 comprises a downstream portion 11 and an upstream portion 12 intervened by an intermediate portion 13 of lesser diameter and by tapered portions 14 and 15.

The zone in the barrel 3 occupied by the intermediate portion 13 constitutes, due to the smaller diameter of intermediate portion 13, a decompression zone in the barrel 3 relative to the zones on each side of the intermediate portion 13.

A valve 16 comprises two rows of pins and a mixing element 17 comprises mixing rings 17a, 17b, 17c each of which comprises two rows of pins; the rows of pins in valve 16 and mixing element 17 are located circumferentially around the screw 2, the pins of one row of a pair being staggered relative to the pins of the other row of the pair, and are mounted in spaced apart relationship on the feed screw 2, the valve 16 being mounted on the portion 12 and the rings 17a, 17b and 17c being mounted on the portion 11.

In the operation of the process a thermoplastic polymer material is fed into the extruder 1 via the hopper 5 and feed port 6. The screw 2 driven by suitable drive means (not shown) advances the thermoplastic polymer material through barrel 3, which is heated by heaters 4. The thermoplastic polymer is thereby forced into intimate and substantially sliding contact with the hot wall 7 of barrel 3, and is also sheared and worked whereby frictional effects are produced.

The thermoplastic material is forced through barrel 3, and a conversion or melt transition is initiated in it, from a solid particulate state to a fluid or molten state, i.e., a polymer melt, by the combined effect of the valve 16, the temperature of the material and to a lesser extent the mixing element 17. It has been found that the position of the melt transition can be predetermined to a large extent by preselection of the form and location of valve 16 and of the temperature maintained in the barrel 3; and that the position is not affected by the dimensions of the die 10, as is believed to be the case when no valve 16 is used.

The ability to select the point of polymer melt formation clearly has a number of advantages. For example, where modifying substances are included in the feed material, the state of the material can be appropriately selected at a given point appropriate to the modifying operation.

The material is subjected to shearing forces to provide mixing and a back pressure produced by the valve 16. This back pressure produces an additional mixing effect, which is supplemented by the mixing action of the pins of the valve 16, which serve to divide the molten thermoplastic material into streams, which reunite after passing the valve 16. The valve 16 produces a thorough mixing of the thermoplastic material before it proceeds into the decompression zone around intermediate portion 13.

The decompression zone provides a relaxation zone for the molten polymer material in which the polymer material is quietly worked and advanced in a nonintensive mixing, after having been subjected to intensive mixing by valve 16. The decompression zone arrests the shear degradation of the polymer material, so that a significant increase in the melt index does not occur.

The polymer material proceeds out of the decompression zone, and is subjected to a mixing action by the mixing rings 17a, 17b and 17c, which serve to intensify the mixing of the polymer material to a uniform state.

The process and apparatus according to the invention are particularly suitable for the extrusion of a coating around a conducting wire in the manufacture of electrical cables, particularly communication cables and power cables.

FIG. 2 is a cross-sectional view of a typical wire covering crosshead employed in the manufacture of electrical cables. With reference to FIG. 2, a crosshead 24 comprises a breaker plate assembly 18, a conducting wire 19 a guide passage 20 for the wire 19, a guide mandrel 21, and an orifice 22.

With further reference to FIG. 3, a plurality of pins 30 and 31 are mounted in the screw 2, the exposed ends of the pins being convexly curved, the pins 30 and 31 forming two rows respectively of pins 30 being in staggered relationship with the pins 31 so that each pin 30 is located exactly opposite the space between two pins 31 and vice versa.

The pins of rings 17a, 17b and 17c are of similar form to those of pins 30 and 31 of valve 16.

With reference to FIG. 4, a detail of a mixing ring 16a of a valve 16 having teeth 23 rather than a plurality of pins is shown.

The valve 16 is located in the screw 2 such that the pins 30 in one ring of the valve 16 fall exactly between the spaces between the pins 31 in the other ring of the valve 16 (see FIG. 3); and the rings of the valve 16 are spaced such that material passing between the rings of the valve 16 has to travel along a tortuous path, for example, 1/16 inches wide between each pin 30 in the first row of pins and corresponding pin 31 in the second row of pins.

The clearance between the upper end of pins 30 and 31 and the wall of the barrel 3 is about 0.008 inches to about 0.06 inches and may be the same as between the screw flights and the barrel.

In the embodiment illustrated in FIG. 1, the valve 16 and mixing rings 17a, 17b and 17c each comprise a pair of rows of pins spaced circumferentially around the screw 2.

The locations and spacings of valve 16 and rings 17a, 17b and 17c relative to the tip of the screw 2 at the downstream extension end in a particular embodiment, for a screw 2 of the dimension given in Table I below, are given in Table II below. In this specific embodiment detailed in Table I, upstream portion 12 comprises three zones namely the first, second and third zones of the screw. The first zone is the feed section; the second zone is a tapered transition section; the third zone is a first metering section. The dimensions given are by way of illustration only, and it will be readily apparent that other dimensions could be used which could be readily determined by experiment.

TABLE I

|  | inches |
| --- | --- |
| Length of screw overall | 76.375 |
| Length of downstream portion 11 | 20 |
| Length of intermediate portion 13 | 2.5 |
| Length of upstream portion 12 | 39.25 |
| first zone of portion 12 | 7 |
| second zone of portion 12 | 22.25 |
| third zone of portion 12 | 10 |
| Axial length of tapered portion 15 | 2.5 |
| Axial length of tapered portion 14 | 1.25 |
| Outside diameter of screw 2 | 2.5 constant |
| Depth of thread at downstream portion 11 | 0.15 nominal |
| Depth of thread at intermediate portion 13 | 0.300 nominal |
| Depth of thread at upstream portion 12 | |
| first zone of portion 12 | 0.330 nominal |
| second zone of portion 12 | tapered |
| third zone of portion 12 | 0.110 nominal |

The overall diameter of the screw 2 is constant throughout (from thread tip to tip), and the diameter of the core of the screw 2 varies according to the depth of the thread.

In the examplified embodiment tapered portion 14, constitutes a fourth zone of the screw; intermediate portion 13 constitutes a fifth zone being the decompression or relaxation zone; tapered portion 15 constitutes a sixth zone; and downstream portion 11 is the seventh zone being a second metering section.

TABLE II

| Rings | $d_1$ inches | $d_2$ inches | $d_3$ inches |
| --- | --- | --- | --- |
| 16 | 0.118–.005 | 0.030 | 26.5 |
| 17a | 0.2162–.003 | 0.120 | 17.5 |
| 17b | 0.1447–.005 | 0.060 | 11.25 |
| 17c | 0.118–.005 | 0.030 | 5 |

$d_1$ is the distance of separation between the adjacent rows of pins,
$d_2$ is the distance between a pin in one row and the closest pin in the other row,
$d_3$ is the distance of the rings from the die end of the screw 2 at the downstream end.

In operation the material in the barrel 3 is forced through the breaker plate 18 and passes to the guide mandrel 21, which is shaped so that the material flows around either side of it, thereby forming a flowing annulus around the mandrel 21, which flows towards the orifice 22 and ultimately contacts the wire. In this manner, a coating is deposited over the wire 19, which moves continuously through the crosshead and acts as an internal forming mandrel. In order to ameliorate the adhesion of the coating to the wire 19 it is found in certain cases to be advantageous to heat the wire 19 which heating can be achieved by passing an electric current through the wire; generally it is desirable to heat wire 19 to a surface temperature of about 200° F. and to maintain this temperature with respect to wire throughput.

Thus in producing a coated wire for an electrical cable the extruded polymer emerges from the die 10 and passes around the mandrel 21 and onto a conducting wire 19 which passes continuously through passage 20. The coated wire emerges through orifice 22.

Additives, for example, fillers, antioxidants and pigments can be added with the solid polymer material in accordance with the invention to modify the properties of the thermoplastic material.

I claim:

1. A screw extrusion apparatus for working a polymer material, which apparatus comprises a barrel leading from a feed port to a discharge, said barrel having a substantially cylindrical interior wall continuous from the feed port end to the discharge end, the wall defining a surface for flow of molten polymer material thereagainst, electrical resistance heaters in said barrel for heating polymer material during passage through said barrel; a continuous feed screw provided with a core and helical thread rotatable in said barrel, said core having upstream and downstream portions interconnected by an intermediate portion of lesser diameter forming a low pressure decompression zone, said decompression zone being effective to arrest shear degradation in a polymer material being worked in said barrel and to provide a zone for quietly working and advancing polymer material without intensive mixing; intense mixing means in said downstream portion; and a combined valve and mixing means on said upstream portion; said combined valve and mixing means comprising at least two closely spaced apart rows of radially disposed lugs mounted normal to and circumferentially around the screw to form a ring, the lugs of one of said rows being in staggered relationship with the lugs of the other of said rows; and said intense mixing means comprising at least three spaced apart mixing elements disposed radially to said screw, each of said elements comprising at least a pair of adjacent rows of radially disposed lugs, the lugs of one row of a mixing element being in a staggered relationship with the lugs of the other of said rows.

2. Apparatus according to claim 1, wherein based on a screw having a L/D ratio of 24:1, said intense mixing means comprises 3 or 4 of said spaced apart mixing elements, each of said elements comprising 2 or 3 of said adjacent rows.

3. Apparatus according to claim 2, wherein said intense mixing means includes not more than one additional mixing element for each additional 4 L/D.

4. Apparatus according to claim 2, wherein said lugs of said combined valve and mixing means and said mixing elements comprise pins and said combined valve and mixing means comprises 2 or 3 rows of said pins.

5. A method of continuously producing a conductor wire insulated with an electrically insulating polymer material in extruded form, said method comprising the steps of:
providing a screw extruder of the type including a barrel having mounted therein for rotation a screw effective to advance and shear solid particulate polymer material, said barrel having a substantially cylindrical interior wall continuous from a feed end of the extruder to a discharge end of the extruder, the wall defining a surface for flow of molten polymer material thereagainst,
providing on the screw combined valve and mixing means effective to convert solid particulate polymer material to a polymer melt and to work in the polymer material wherein the combined valve and mixing means includes at least two closely spaced apart rows of radially disposed pins mounted normal to and circumferentially around the screw to form a ring and wherein the pins of one of the rows is in staggered relationship with the pins of the other of the rows;
providing the screw with a decompression zone downstream of the valve means followed by a high pressure zone, said decompression zone being effective to arrest shear degradation in said polymer;
providing on the screw downstream of the high pressure zone intense mixing means effective to intensively work the polymer material wherein the intense mixing means includes at least three spaced apart mixing rings disposed radially to the screw and each mixing ring including at least a pair of adjacent rows of radially disposed pins with the pins of each row of a mixing ring being in a staggered relationship with the pins of the adjacent row;
providing an extrusion head for the extruder;
passing a moving conductor wire through the extrusion head;
introducing an electrically insulating, solid particulate polymer material, into the feed end of the extruder barrel;
passing the material through the barrel, heating and shearing the material in a first upstream portion of the barrel;
advancing the material through the barrel towards the combined valve and mixing means to convert the solid particulate polymer material to a polymer melt;
advancing the polymer melt through said combined valve and mixing means to divide the melt into streams between the staggered pins, allowing said streams to reunite on emerging from the combined means whereby the polymer melt is thoroughly mixed;
advancing the polymer melt into the decompression zone downstream of the combined valve and mixing means while maintaining the shearing in a nonintensive mixing;
quietly working and advancing the polymer melt through the low pressure decompression zone as a flow of essential molten material, against said interior wall surfaces, so as to arrest shear degradation;
forcing the resultant mass out of the low pressure decompression zone and into the zone of higher pressure, passing the mass through the intense mixing means and subjecting it to an intense mixing action;
forcing the mixture through the extrusion head and about the moving conductor wire;
and then collecting the conductor wire insulated with the insulating material.

6. A method according to claim 5, wherein based on a screw having a L/D ratio of 24:1, the intense mixing means comprises 3 to 4 of the spaced apart mixing rings, each of the mixing rings comprising 2 to 3 of the adjacent rows of pins; and the combined valve and mixing means comprises 2 to 3 of the rows of pins.

7. A method according to claim 6, wherein said intense mixing means includes not more than one additional mixing element for each additional 4 L/D.

8. A method according to claim 7, wherein said pins of said combined valve and mixing means and of said intense mixing means comprise pins having an outer end profiled to match the internal contour of said barrel.

9. A method according to claim 5, wherein said decompression zone is effective to arrest shear degradation in said polymer such that the melt index of insulating material on the insulated conductor wire is not more than 50% of the melt index of the solid, particulate polymer material.

10. A method according to claim 9, wherein said polymer material is a propylene/ethylene copolymer containing about 80% propylene and 20% ethylene.

* * * * *